United States Patent [19]
Riza

[11] Patent Number: 5,568,286
[45] Date of Patent: Oct. 22, 1996

[54] FAST LIQUID CRYSTAL SWITCHING UNIT

[75] Inventor: Nabeel A. Riza, Clifton Park, N.Y.

[73] Assignee: General Electric Company, Schenectady, N.Y.

[21] Appl. No.: 130,819

[22] Filed: Oct. 4, 1993

[51] Int. Cl.⁶ ............................. G02F 1/13; G02F 1/1335; G02F 1/1347; H01Q 3/22
[52] U.S. Cl. .............................. 359/53; 342/375; 359/41; 359/140
[58] Field of Search .................... 359/39, 40, 41, 359/53, 140; 342/374, 375

[56] References Cited

U.S. PATENT DOCUMENTS

| | | | |
|---|---|---|---|
| 4,948,229 | 8/1990 | Sovef | 359/39 |
| 5,117,239 | 5/1992 | Riza | 342/375 |
| 5,231,405 | 7/1993 | Riza | 342/375 |
| 5,319,477 | 6/1994 | Dejule et al. | 342/375 |
| 5,430,454 | 7/1995 | Refregier et al. | 342/375 |

OTHER PUBLICATIONS

K. Kawai et al., "17-in.-Diagonal Color TFT-LCDs for Engineering Workstations", SID 93 Digest, pp. 743–746.
Wu et al., "Small Angle Relaxation of Highly Deformed Nematic Liquid Crystals", Appl. Phys. Lett. 53 (19), Nov. 7, 1988, pp. 1794–1796.
Fergason, "Performance of a Matrix Display Using Surface Mode", 1980 Biennial Display Research Conference, IEEE, 1980, pp. 177–179.

*Primary Examiner*—William L. Sikes
*Assistant Examiner*—Ron Trice
*Attorney, Agent, or Firm*—Donald S. Ingraham

[57] ABSTRACT

A fast-speed optical switching unit includes a polarization rotation unit having plurality of liquid crystal cells disposed on a common substrate and optically coupled together in series so as to impart a selected linear polarization orientation to an incident light beam. The polarization rotation unit is optically coupled to beam-directing optics such that, dependent on the polarization orientation of the light beam passing from the polarization unit, the light beam is directed onto a predetermined path. The multiple liquid crystal cells driven by a selected control voltage so as to operate in the fast speed regime, thus collectively effecting a faster change in polarization orientation of a light beam passing therethrough than is obtainable with a single liquid crystal cell.

18 Claims, 2 Drawing Sheets

FAST LIQUID CRYSTAL SWITCHING UNIT

BACKGROUND OF THE INVENTION

Optical signal processing systems are used to manipulate the characteristics of optical signals, or light beams. For example, the direction, intensity, polarization, phase (or a combination of such characteristics) of a light beam may be manipulated by appropriate equipment so that the manipulated characteristics represent the desired processing of the optical signal.

An essential component in most optical processing systems is an efficient light switch. Key characteristics for a light switch used in a signal processing system include the time for an optical switch to be changed from one position to another and the amount of loss the optical signal experiences in the switch (particularly in systems in which the processed light must pass through many switches). For example, a commonly used light switch is a lithium niobate integrated optic type of switch, which, although it has relatively fast switching times (e.g., about 5 nsec.), typically has about 3 dB light loss per switch. Thus, for example, if an optical signal passed through only seven switches in a signal processing system, such as a 7-bit binary optical delay line, its intensity would drop 21 dB, that is, the light amplitude of the output signal drops to $\frac{1}{128}$th of the input amplitude.

A type of light switch that offers efficient, low light loss operation includes a beam splitter and a liquid crystal array to selectively control the polarization of light beams entering the beamsplitter. Nematic liquid crystal (NLC) switching arrays typically are relatively slow, at least with respect to the switching mode in which the control voltage is reduced across the liquid crystal and the liquid crystal molecules "relax", that is, the orientation of the molecules changes to correspond to the reduced electric field. For efficient polarization-based switching, the polarization orientation of the light passing through the liquid crystal molecules must be rotated by 90°; the time for the liquid crystal molecules to be displaced sufficiently to cause such a π-radian phase shift of the light can range from 30 msec to 5 msec, dependent on cell characteristics such as thickness, NLC mixture birefringence, the optical wavelength, and the applied voltage.

Several different operating regimes have been suggested to improve NLC switching times. For example, "surface mode" operation (also referred to as the bias voltage effect), discussed by J. L. Fergason in "Performance of a Matdx Display Using a Surface Mode", IEEE 1980 Biennial Display Research Conference Proceedings, pp 177–179 (incorporated herein by reference), involves using changes in the orientation of the molecules near to the sides of the cell to effect a polarization change in light passing therethrough. Surface mode operation involves applying a relatively high bias voltage across the NLC such that substantially all the liquid crystals except those close to the sides are aligned with the high electric field; switching is accomplished, for example, by reducing the electric field to a lower value, thereby causing relaxation of liquid crystal molecules near the sides of the cell. This type of operation improves switching speeds, although the switching times dependent on relaxation of the molecules is still relatively long (e.g., 5 msec.).

Another approach to improving NLC switching times, referred to as the "transient nematic liquid crystal (LC) effect" is described in "Small angle relaxation of highly deformed nematic liquid crystals," by S-T. Wu and C-S Wu in *Applied Physics Letters*, volume 53, pp 1794–1796 (November 1988), and incorporated herein by reference. The transient nematic effect also involves maintaining a relatively high bias voltage across the LC cell (such that substantially all LC molecules except in the barrier layer are aligned with the field, similar to the surface mode operation described above). In the switching mode in which the molecules relax, the bias voltage is removed entirely, allowing the directors to undergo free relaxation until a desired (minimum) transmitted light intensity is reached, at which a second control voltage is applied (lower than the original control voltage) to stop the motion of the LC directors. This method provides some improvement in switching speed, but remains limited to speeds of about 1 msec. The transient nematic LC effect thus generally provides about a fivefold improvement in operating time (that is, faster switching time) dependent on conditions such as LC temperature, birefringence, and cell thickness.

It is desirable that switching units in optical signal systems have relatively fast speed operation (e.g., a switching time of less than about 100 μsec.), exhibit low attenuation, be of compact size, rugged, readily fabricated, and adapted to processing a large number of separate signal light beams (e.g., up to thousands of beams) as would be necessary for operation of a phased array transducer system. It is further desirable, from the standpoint of manufacturing ease and efficiency, that each optical switch comprise as few optical devices, such as beamsplitters, as practicable.

It is accordingly an object of this invention to provide an optical switching unit having relatively fast speed switching and that is readily adapted to use in a cascade of other optical processing devices.

It is a further object of this invention to provide a fast speed optical switching unit that is readily fabricated in a cascade of similar devices.

SUMMARY OF THE INVENTION

An optical switching unit for directing incident light beams to a selected path includes a polarization rotation unit and beam-directing optics coupled to receive light from the polarization rotation unit and direct the light along a predetermined path dependent on the polarization orientation of the light. The polarization rotation unit includes two or more liquid crystal cells optically coupled together in series such that each of the incident light beams pass sequentially through the two or more liquid crystal cells so that a respective selected polarization orientation is imparted to the light beam. The liquid crystal cells typically are driven by a common voltage source and the liquid crystal cells are typically disposed on a common substrate, providing a structure that is readily fabricated and adapted to have respective LC cells disposed together in a cascade arrangement. The beam-directing optics typically comprises a polarizing beam splitter.

An optical signal processing system advantageously comprises a first plurality of optical switching units coupled to a second plurality of time delay units in a cascade arrangement so that light beams pass through the cascade and are selectively directed into a respective selected time delay unit by a respective optical switching unit.

A method for fast-speed switching of optical signals includes the step of directing a light beam into a polarization rotation unit comprising a plurality of liquid crystal cells optically coupled together in stages such that the light beam passes sequentially from one of the liquid crystal cells to the next in the polarization unit, applying an equivalent control voltage to each respective liquid crystal cell in the polarization rotation unit, and passing the light beam through optics so that it is directed onto a respective predetermined path dependent on the polarization orientation of the light beam passing from the polarization rotation unit.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description in conjunction with the accompanying drawings in which like characters represent like parts throughout the drawings, and in which:

DETAILED DESCRIPTION OF THE INVENTION

Figure 1:
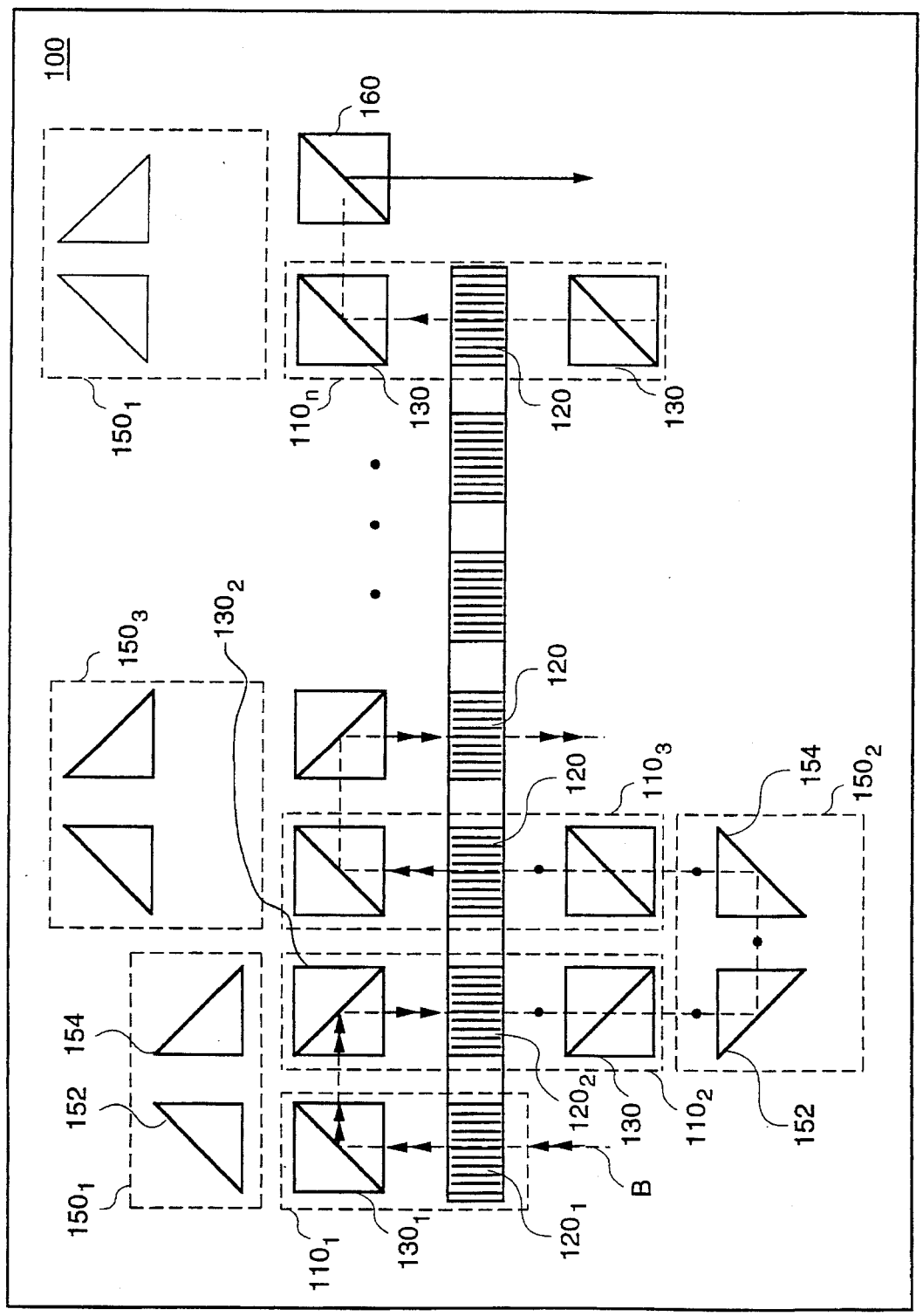
FIG. 1 is a schematic representation of an optical signal processing system having fast speed optical switching units in accordance with one embodiment of this invention.

FIG. 1 illustrates an optical signal processing system 100 for generating differentially time delayed optical signals (as might be used for steering a beam in a phased array system) and which comprises a plurality of optical switching units $110_1$ - $110_n$ optically coupled in a cascade arrangement and a plurality of optical time delay units $150_1$-$150_n$ optically coupled between respective optical switching units. As used herein, "cascade arrangement" refers to two or more components optically coupled such that light beams can pass sequentially from one component to the next component to which it is coupled.

Optical signal processing system 100 is adapted to receive light beams from a light source (or alternatively, a plurality of light sources) (not shown), which source typically comprises a laser adapted to provide polarized light beams of the appropriate intensity and/or temporal modulations required for use in the processing system. The light source typically generates a plurality of collinear light beams which pass into first optical switching unit $110_1$ (for ease of description and reference to the figures, reference to a specific switching unit or component thereof includes a subscript denoting the particular switching unit in the cascade when it is necessary to denote a particular stage of the cascade). For ease of illustration, one representative beam "B" is shown in FIG. 1.

Figure 2:
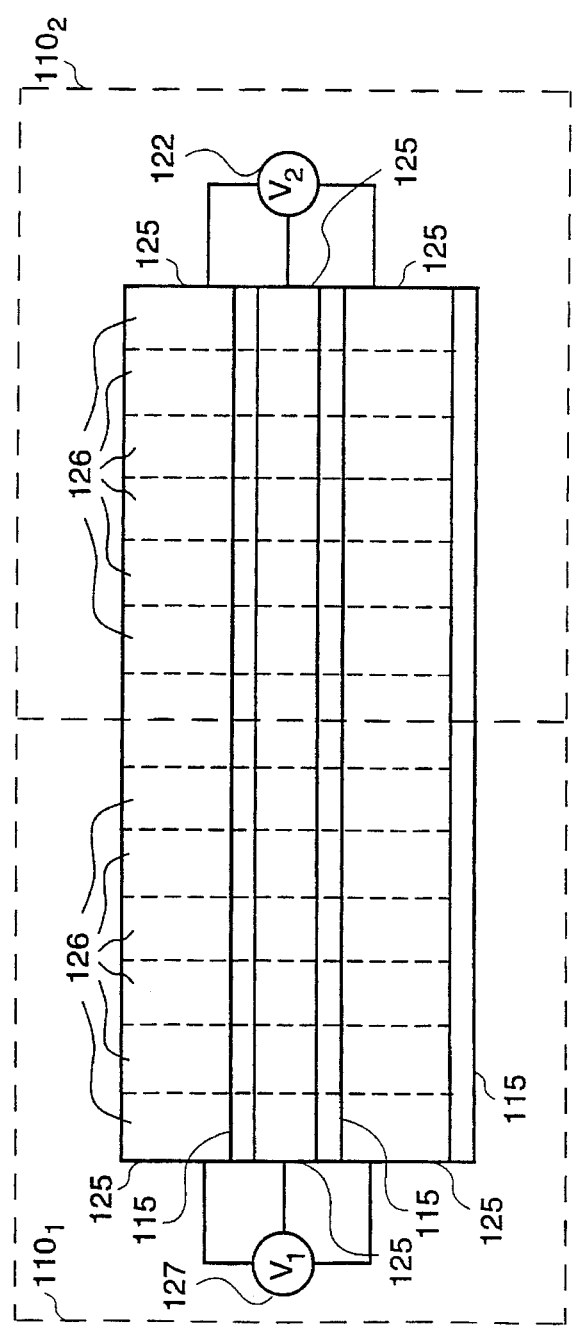
FIG. 2 is a schematic diagram of a polarization rotation unit in accordance with this invention.

Each optical switching unit 110 comprises a respective polarization rotation unit 120 optically coupled to respective beam-directing optics 130. In accordance with this invention, polarization rotation unit 120 comprises a plurality of liquid crystal cells 125 disposed together in sequence, as illustrated in FIG. 2. Each liquid crystal cell 125 typically comprises a two-dimensional array of liquid crystal pixels 126 which are individually controllable and comprise parallel-rub birefringent nematic liquid crystals (NLCs), or the like. Each pixel is illuminated by at least one light beam passing from the light source (for ease of discussion, the light that passes through one pixel is assumed to constitute one light beam).

In each polarization rotation unit 120 the plurality of liquid crystal cells 125 are optically coupled together such that a light beam entering unit 120 passes sequentially through each liquid crystal cell 125 in unit 120. Typically liquid crystal cells 125 are disposed on a substrate 115, with one cell being disposed substantially adjacent to the next such that the pattern of pixels 126 in each cell 125 is aligned with the pixels in the adjacent cell. Each liquid cell 125 comprises a plurality of LC pixels, and each LC pixel comprises liquid crystal material disposed between two electrodes (not shown in FIG. 2). Substrate 115 typically comprises glass or similar sturdy light-transmissive material. In accordance with the present invention, a light beam entering a respective polarization rotation unit 120 passes sequentially through corresponding pixels in each LC cell 125 in the respective unit 110; the polarization orientation of a given light beam is thus determined by the control voltages applied to drive the corresponding pixels (that is, the control voltage determines the orientation of the liquid crystal directors in a given pixel) in each of the LC cells in a polarization unit.

In each respective polarization rotation unit 120, each corresponding LC pixel 126 in respective LC cells 125 (forming the sequence or cascade of pixels through which the light beam will pass) is adapted to be driven by the same control voltage so that the liquid crystal directors in each corresponding pixel in a particular polarization rotation unit 120 are displaced by the same amount. Typically a control voltage source 127 (illustrative voltage sources shown schematically in FIG. 2 as applied to one set of corresponding pixels in polarization rotation units $110_1$ and $110_2$ respectively; additional voltage sources (not shown) would control other sets of corresponding pixels) is coupled to corresponding ones of the LC pixels 126 in LC cells 125 of a respective polarization rotation unit; alternatively, separate voltage sources, providing the same (or equivalent) signal, can be coupled to drive the individual corresponding LC pixels in the respective LC cells 125. The ultimate polarization orientation of a light beam as it emerges from a set of corresponding LC pixels in a polarization rotation unit is determined by the sum of the orientation deflections that the light beam undergoes in each LC cell 125 through which it passes in the polarization rotation unit 120.

The structure of the present invention lends itself to the use of large area amorphous silicon fabrication techniques so that multiple liquid crystal cells 125 in a particular polarization rotation unit 120 are readily fabricated in the desired cascade arrangement. Further, the polarization rotation units 120 for multiple switching units $110_1$-$110_n$ are advantageously fabricated on respective substrates 115, which can be arranged in levels corresponding to the number of pixels through which it is desired that the light pass to obtain the desired polarization shift in a polarization rotation unit. This combined substrate structure (i.e., a common substrate for LC cells on a particular level in adjoining polarization rotation units) for optical signal processing system 100 has advantages including ease of fabrication and assembly of the NLC cells; in particular, pixels in cells for each time delay unit do not have to be individually cut, mounted, and aligned on a per-pixel basis with adjoining cells as necessary for system operation. The fabrication process is also expedited in that fabrication steps such as chemical deposition, etching, and annealing are respectively accomplished at the same time for each array of pixels (in each respective LC cell in an optical switching unit 110) disposed at a given level of LC cell 125 on substrate 115. Each layer of liquid crystal cells 125 forming the cascade of NLCs in the respective polarization rotation units 120 is similarly deposited and patterned, enabling fabrication of the multi-layer cascades of NLCs to provide the fast speed switching structure of the present invention. In accordance with this invention, each polarization rotation unit 120 thus advantageously comprises a plurality of LC cells 125 disposed adjacent in an integral structure (that is, each LC cell adjoins respective adjoining LC cells in the cascade sequence) that is compact, rugged, and readily fabricated.

In accordance with this invention, each polarization rotation unit 120 comprises two or more LC cells 125. The switching speed (that is, the time to cause a shift of 90° of the polarization orientation of a light beam passing through the LC cell) of polarization rotation unit 120 (in the condition in which the LC directors "relax" to effect the desired polarization shift) corresponds to the number of LC cells 125 in the unit. Specifically, switching speed is inversely related to the square of the number of LC cells (i.e., $1/n^2$); thus a polarization rotation unit having two LC cells switches in ¼ the time of a single LC cell unit, a three-LC cell unit switches in ⅑ the time and so forth. This improvement in switching time results from operation of each of the LC cells in the polarization rotation unit in the fast response regime; that is the amount of polarization orientation of light passing from the cell is large compared with the difference in control voltage applied. In this regime the liquid crystal directors in the LC cell move (change orientation) more quickly per unit change in the applied voltage. Nematic liquid crystals generally operate (decay) in a fast response regime up to a point at which about there is about a 45° change in the polarization orientation of the light, after which the incremental change in polarization orientation of the light takes a longer time. This difference in response time results when the highly stressed NLC molecules held by a high voltage electric field experience the sudden removal of the electric field (applied control voltage≈0 Volts); the molecules spring back and start turning quickly in the initial stages of decay. To obtain fast switching with NLCs, it is desirable to operate each NLC cell in a respective cascade in the fast response regime, using a number of NLC cells coupled together in series to provide the desired total 90° polarization rotation of the light beam.

In each optical switching unit 110 beam-directing optics 130 (FIG. 1) are disposed to receive light beams passing from respective polarization rotation unit 120 and direct the respective light beams along respective selected paths dependent on the polarization orientation of each respective light beam. Beam-directing optics 130 typically comprise at least one polarizing beam splitter (PBS). For purposes of explanation of the present invention, and not limitation, a cube PBS is described in which light is typically deflected at 90° angles or passed directly through, dependent on the linear polarization of the light beam. Alternatively, other types of PBSs can be used, such as Thompson PBSs, in which the deflection angle of linearly polarized light is other than 90°, with the appropriate adjustment of the optical architecture to adjust for the different light paths. As used herein, "PBS" refers to the entire PBS assembly, not just the interface of the prisms at which light beam separation occurs.

Each cube PBS 130 is optically coupled to a respective polarization rotation unit 120 and disposed such that light of a first linear polarization (e.g., p-polarized light) is deflected onto a first predetermined path, and light having a linear polarization orthogonal to the first linear polarization (the orthogonally-polarized light being s-polarized light in this example) is directed onto a second predetermined path.

Dependent on its position in the cascade, an optical switching unit 110 comprises an input PBS 130 and an output PBS 130 so that light beams received by an optical switching unit directly from the immediately-preceeding optical switching unit and the preceding optical time delay unit are directed into the respective polarization rotation unit 120 of the receiving optical switching unit.

A fast-speed optical switching unit 110 in accordance with this invention is advantageously used in a signal processing system 100 in a cascade of such units coupled to impart a selected time delay to respective light beams passing through system 100. In this arrangement, each optical switching unit 110 is optically coupled to an optical time delay unit 150 so that light beams directed onto one of the predetermined paths by beam-directing optics 130 passes into a respective optical time delay unit. As illustrated in FIG. 2, first optical switching unit 110₁ is optically coupled both to first optical time delay unit 150₁ and second optical switching unit 110₂ such that the output of (that is, light emanating from) switching unit 110₁ is directed (dependent upon the linear polarization of the light beam) along either one predetermined path into the input of (that is, the portion adapted to receive light beams) of optical time delay unit 150₁, or alternatively along the other predetermined path into the input of second optical switching unit 110₂. Optical time delay unit 150₁ is optically coupled such that light beams passing from it are directed to the input of optical switching unit 110₂. The respective optical switching units 110 and time delay units 150 are thus optically coupled in a cascade arrangement as shown in FIG. 2, with "n" optical switching units and "n" time delay units comprising signal processing system 100.

Each optical time delay unit 150 comprises a first mirror prism 152 and a second mirror prism 154. Alternatively, similar light deflection devices such as a fiber optic line or the like can be used for the delay path apparatus. Prisms 152 and 154 are disposed such that light passing into optical time delay unit 150 is directed along a delay path (a path longer than that taken by light directed along the other predetermined path directly (the direct path) to the next optical switching unit 110 in the cascade) and back into the input of the next sequential optical switching unit 110 in the cascade.

In operation, collimated light of a known linear polarization from the light source (or, alternatively, plurality of light sources) enters the cascade of optical switching units at first optical switching unit 110₁. Operation of the optical signal processing system necessitates that collimation of the light beams be maintained as it progresses through the cascade of optical switching units; a lens-based imaging system (not shown) is typically disposed in the path of the light beams passing between optical switching units to maintain appropriate collimation. Alternatively, spherical lenses for imaging can also be positioned in delay assemblies or other areas of the optical architecture of a device comprising the present invention.

The linear polarization of each light beam is selected as it passes through the respective pixels of LC cells 125 in polarization rotation unit 120₁, and, dependent on the linear polarization passing from unit 120₁, the light beam is directed along either the direct path or the delay path of optical switching unit 110₁. Similarly, in each sequential optical switching unit 110, the linear polarization of each light beam emerging from the previous optical switching unit is known based upon previous manipulation of the beam's polarization in the preceding optical switching units, and thus as each respective beam passes through the respective polarization rotation unit in each optical switching unit the polarization orientation of the beam can be further manipulated as necessary to direct the beam along the desired path in a given optical switching unit.

By way of example and not limitation, a representative light beam "B" is illustrated in FIG. 1 entering optical switching unit $110_1$. This light beam is illustrated as being "p" or horizontally linearly polarized (the electric vector of the light is parallel to the plane of incidence, i.e., the plane of the page as illustrated in FIG. 1 and indicated by the twin headed arrows shown on the light beam line). For purposes of illustration only, the pixels in the respective LC cells in polarization rotation unit $120_1$ (for ease of discussion, particular components in a given optical switching unit will be referenced by the subscript of the respective optical switching unit) through which light beam B passes is shown to allow p-polarized light to pass through with its polarization unaltered. PBS $130_1$ is disposed such that p-polarized light is deflected by about 90° onto the direct path to the optical switching unit $110_2$. Light beam B thus passes undelayed into the next optical switching unit in the cascade.

As beam B enters second optical switching unit $110_2$, it is received by an input PBS $130_2$, which deflects the p-polarized light into polarization rotation unit $120_2$ in which the light passes though a predetermined respective pixels in LC cells 125. For purposes of illustration, the polarization orientation of light beam "B" is rotated by 90° in polarization rotation unit $120_2$ such that the beam is now s-polarized, or vertically polarized (extending perpendicularly out of the plane of the page, illustrated by the round circles on the beam line). Light of this polarization passes directly though output PBS $130_2$ and into second optical time delay unit $150_2$. Beam B is then deflected in mirror prism unit 152 such that it is directed to second mirror prism unit 154 and thence back into the input PBS for optical switching unit $110_3$, which is oriented to direct light beam B into the respective polarization rotation unit 120 for that switching unit.

The polarization orientation of beam B is selectively determined in each optical switching unit of the cascade to determine whether the beam is directed along the direct path or delay path at each stage of the cascade, until the beam passes from the last optical switching unit $110_n$ or from the last optical time delay unit $150_n$. A system output PBS 160 is disposed to direct light beams received from both the direct path and delay path to one direction for the optical signal processing system's output.

Thus, a plurality of light beams necessary for generating the ultimate control signal for the device in which this system is employed pass simultaneously into the first optical switching unit. Respective manipulation of the linear polarization of each light beam in each optical switching unit determines whether a respective light beam passes along the delay path or the direct path in a particular optical switching unit. The cumulative effect of these manipulations provides, at the output of the cascade of optical switching devices, a plurality of differentially time delayed optical signals. These optical signals are typically convened to electrical signals to drive phased array transducers, as in an ultrasonic transducer array used for medical or non-destructive testing imaging. In accordance with this invention, the switching time of the optical signals in each polarization rotation unit is lessened, dependent on the number of LC cells 125 comprising the polarization rotation unit; the improved switching times allows for faster processing.

Figure 3:
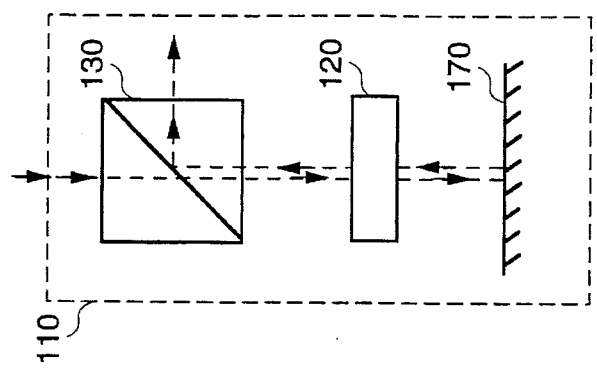
FIG. 3 is a schematic diagram of an optical switching unit in accordance with another embodiment of this invention.

An alternative embodiment of an optical switching unit in accordance with this invention is illustrated in FIG. 3. The optical switching unit 110 illustrated in FIG. 3 comprises polarization rotation unit 120 and beam-directing optics 130 (typically a PBS) as described above. Unit 110 further comprises a reflector 170, such as a mirror or the like, optically coupled to polarization rotation unit 120. A light beam received by optical switching unit 110 passes through PBS 130 into polarization rotation unit 120, and thence onto reflector 170, which is disposed to reflect the incident light beam back into unit 120. The reflected light beam passes through rotation unit 120 a second time and back into PBS 130; dependent on the polarization rotation imparted to the beam during the two passes through rotation unit 120, the light beam is directed in PBS 130 onto a predetermined path. By way of example and not limitation, an incident light beam "B" is shown incident on optical switching unit 110 and having a polarization orientation that allows it to pass directly through PBS 130 into rotation unit 120. After the first pass through rotation unit 120, light beam B is reflected by reflector back through rotation unit 120, and is shown in the illustration as having undergone a polarization shift such that it is deflected by 90° as it reenters PBS 130. The polarization rotation unit 120 of optical switching unit 110 illustrated in FIG. 3 similarly comprises a cascade of LC cells fabricated on a substrate and is readily fabricated in an optical processing unit as described above.

The embodiment of the present invention illustrated in FIG. 3 provides for each incident light beam to pass two times through polarization unit 120. Thus an increase in switching speed is obtainable by multiple passes through the same liquid crystal pixel (as opposed to a light beam passing through multiple liquid crystal cells). Polarization rotation unit 120 typically comprises multiple liquid crystal cells (N cells) as described above; the effect of passing an incident light beam across the cells a second time is to increase the effective number of cells, that is the same as having 2N cells.

In each of the embodiments of the invention, control voltages are selected to provide the desired polarization rotation (typically to produce either p or s polarized light, but not a combination), dependent on the effective number of liquid crystal cells used in the polarization rotation unit. The cascade arrangement of LC cells are readily fabricated as described above in large arrays and provide fast speed switching (e.g., 100 μsec or less switching times) through only the use of polarization shifting of the incident light beams; the optical switching unit in accordance with this invention is not dependent on other manipulation of the light beams, such as use of constructive or destructive interference to achieve the desired optical switching.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A fast-speed optical switching unit for directing incident light beams to a selected path comprising:

a polarization rotation unit optically coupled to receive said incident light beams, said polarization rotation unit comprising an effective plurality of "n" parallel-rub birefringent nematic liquid crystal cells optically coupled in series in an integral cascade structure such that each of said incident light beams pass sequentially through each of said n liquid crystal cells so that a respective selected polarization orientation is imparted to each respective light beam, said polarization rotation unit having a switching speed corresponding to the value of $1/n^2$; and beam-directing optics optically coupled to receive light beams from said polarization rotation unit and disposed to direct respective light beams along respective selected paths dependent on the polarization orientation of each respective light beam.

2. The device of claim 1 wherein each of said liquid crystal cells in said polarization rotation unit is driven by an equivalent control voltage.

3. The device of claim 2 wherein each of said liquid crystal cells in said polarization rotation unit is electrically coupled to a common control voltage source.

4. The device of claim 2 wherein said liquid crystal cells are disposed on a common substrate.

5. The device of claim 2 wherein said beam-directing optics comprise a polarizing beam splitter.

6. The device of claim 5 wherein said respective beam directing optics further comprise first and second optics units, said units being disposed, respectively, on opposite sides of said polarization rotation unit.

7. The device of claim 5 wherein said beam directing optics further comprise a reflector optically coupled to one side of said plurality of liquid crystal cells in said polarization rotation unit, said polarizing beam splitter being optically coupled to the opposite side of said liquid crystal cells such that light incident on said optical switching unit initially passes through said polarizing beam splitter into said plurality of liquid crystal cells and thence to said reflector whereupon the light beam is reflected back through said plurality of liquid crystal cells and into said polarizing beam splitter, and said polarization rotation unit has n/2 liquid crystal cells.

8. A fast-switching optical signal processing system comprising:

a plurality of optical switching assemblies optically coupled together in stages; and a plurality of optical time delay units, one of said optical time delay units being coupled between each stage of said optical switching assemblies;

each of said pluralities of optical switching assemblies comprising a polarization rotation unit and beam-directing optics, each of said polarization rotation units comprising a respective plurality of "n" parallel-rub birefringent nematic liquid crystal cells disposed in series in an integral cascade structure such that light beams incident on each of said polarization rotation units pass sequentially through each of said n liquid crystal cells so that a respective selected polarization orientation is imparted to each respective light beam, said polarization rotation unit having a switching speed corresponding to the value of $1/n^2$, said beam-directing optics being optically coupled to receive light beams from said polarization rotation unit and disposed to deflect respective light beams along respective selected paths dependent on the polarization orientation of each respective light beam.

9. The device of claim 8 wherein each of said pluralities of liquid crystal cells in each respective polarization rotation unit is disposed on a single substrate.

10. The device of claim 9 wherein the liquid crystal cells of each of said polarization rotation units are disposed on a common substrate.

11. The device of claim 9 wherein each of said liquid crystal cells in each respective polarization switching unit comprises a plurality of liquid crystal pixels, said pixels in each of said liquid crystal cells being arranged in a pattern such that a light beam incident on one of said pixels passes through a corresponding pixel in each of said liquid crystal cells.

12. The device of claim 11 wherein each respective corresponding pixel in said plurality of liquid crystal cells in one polarization rotation unit is electrically coupled to a common control voltage source.

13. The device of claim 12 wherein said beam directing optics comprises a polarizing beam splitter disposed to receive light beams passing from said polarization rotation unit.

14. The device of claim 13 wherein said beam directing optics further comprises a second polarizing beam splitter disposed to receive incident light beams and deflect said light beams into said polarization rotation unit.

15. A method for fast-speed optical switching of optical signals using liquid crystal cells comprising the steps of:

directing a light beam into a polarization rotation unit comprising a plurality of "n" parallel-rub birefringent nematic liquid crystal cells disposed in stages in an integral cascade structure such that the light beam passes sequentially from one of said liquid crystal cells to the next sequential liquid crystal cell in said polarization rotation unit, said polarization rotation unit having a switching speed corresponding to the value of $1/n^2$; and applying a common control voltage to each respective liquid crystal cell in said polarization rotation unit; and passing said light beam through optics so that it is directed onto a respective predetermined path dependent on the polarization of the light beam passing from said polarization rotation unit.

16. The method of claim 15 wherein the step of passing said light beam through optics comprises passing said light beam through a polarizing beam splitter.

17. The method of claim 16 wherein the step of applying a common control voltage to said plurality of liquid crystal cells in said polarization rotation unit further comprises selecting said common control voltage such that the light beam passing from said polarization rotation unit is either vertically linearly polarized or horizontally linearly polarized.

18. The method of claim 17 wherein said common control voltage is further selected such that each of said liquid crystal cells in said polarization rotation unit operates in the fast-response regime of nematic liquid crystal cells.

* * * * *